(12) United States Patent
Meyer

(10) Patent No.: US 9,505,171 B2
(45) Date of Patent: Nov. 29, 2016

(54) POLYMER ADDITIVE LAYER MANUFACTURING

(75) Inventor: Jonathan Meyer, Calne (GB)

(73) Assignee: AIRBUS GROUP LIMITED, London (GB)

( * ) Notice: Subject to any disclaimer, the term of this patent is extended or adjusted under 35 U.S.C. 154(b) by 403 days.

(21) Appl. No.: 14/118,808

(22) PCT Filed: May 9, 2012

(86) PCT No.: PCT/GB2012/051011
§ 371 (c)(1),
(2), (4) Date: Feb. 26, 2014

(87) PCT Pub. No.: WO2012/160344
PCT Pub. Date: Nov. 29, 2012

(65) Prior Publication Data
US 2014/0197579 A1    Jul. 17, 2014

(30) Foreign Application Priority Data

May 20, 2011   (GB) .................................. 1108455.5

(51) Int. Cl.
| B29C 33/52 | (2006.01) |
| B29C 41/38 | (2006.01) |
| C08G 65/40 | (2006.01) |
| C08G 69/08 | (2006.01) |
| C08L 71/00 | (2006.01) |
| B29C 67/00 | (2006.01) |
| B29C 33/44 | (2006.01) |
| B29K 55/02 | (2006.01) |
| B29K 71/00 | (2006.01) |

(52) U.S. Cl.
CPC .......... B29C 67/0077 (2013.01); B29C 33/448 (2013.01); *B29K 2055/02* (2013.01); *B29K 2071/00* (2013.01); *Y10T 428/31946* (2015.04)

(58) Field of Classification Search
CPC ..... B29C 33/448; B29C 33/52; B29C 41/38; B29C 67/0077; B29K 2055/02; B29K 2071/00; C08G 65/40; C08G 69/08; C08L 71/00

USPC .......... 264/37.29, 317, 460, 461, 482, 485, 264/497; 528/125, 220, 310, 350
See application file for complete search history.

(56) References Cited

U.S. PATENT DOCUMENTS

| 2006/0134419 A1* | 6/2006 | Monsheimer ....... B29C 67/0077 264/497 X |
| 2007/0267766 A1 | 11/2007 | Hesse et al. |
| 2009/0295042 A1 | 12/2009 | Pfister et al. |
| 2010/0086721 A1* | 4/2010 | Batchelder .......... B29C 67/0092 428/43 |
| 2010/0171241 A1 | 7/2010 | Huskamp et al. |

FOREIGN PATENT DOCUMENTS

EP   1 674 497 A1   6/2006

OTHER PUBLICATIONS

Corresponding International Application No. PCT/GB2012/051011 Search Report dated Aug. 6, 2012.
Corresponding International Application No. PCT/GB2012/051011 Written Opinion dated Aug. 6, 2012.
United Kingdom Application No. GB1108455.5 Search Report dated Sep. 16, 2011.

* cited by examiner

*Primary Examiner* — Leo B Tentoni
(74) *Attorney, Agent, or Firm* — Hauptman Ham, LLP

(57) ABSTRACT

An additive layer manufacturing method for producing a shaped article, comprising providing a powdered thermoplastic polymer material (7, 8) having a re-solidification temperature at most 10% below its melting temperature on the Celsius scale, depositing successive layers of the powdered polymer material (7, 8) and selectively sintering each layer prior to deposition of the subsequent layer so as to form the article, wherein during its production the article is maintained at a temperature above the glass transition temperature and significantly below the re-solidification temperature of the polymer.

13 Claims, 4 Drawing Sheets

POLYMER ADDITIVE LAYER MANUFACTURING

RELATED APPLICATIONS

The present application is a National Phase of International Application Number PCT/GB2012/051011, filed May 9, 2012, and claims priority to United Kingdom Application Number 1108455.5, filed May 20, 2013.

FIELD OF THE INVENTION

The present invention relates to an additive layer manufacturing method for producing a shaped article from polymer material.

BACKGROUND OF THE INVENTION

Additive layer manufacturing (ALM) is a process by which an article is produced layer by layer using 3D model data. The process may be used for producing prototypes, samples, models, tooling or full scale components.

A known ALM technique uses a power beam, such as a laser or an electron beam for example, to selectively sinter powdered material. A continuous bed of the powdered material is laid over a support member in a sintering chamber, and the power beam is used to selectively sinter the powder in a desired pattern by scanning across the surface of the powder bed. The power beam is controlled to produce the desired pattern according to cross-sections generated from 3D model data (e.g. a CAD file) of the article. The sintering chamber is typically heated so as to pre-heat the powder material in the powder bed to below the melting point of the powder material, thereby making it easier for the power beam to melt the powder in the selected regions.

After each cross-section is scanned and the melted powder has solidified, the substrate is lowered by one layer thickness (typically of the order of 0.1 mm) to prepare for growth of the next layer. Another layer of the powder is applied on top of the preceding layer in preparation for sintering. The process is repeated until the article is completed. Thus as the process proceeds, a sintered article is constructed, supported by unconsolidated powder. After the article has been completed it is removed from the substrate and the unconsolidated powder is typically recycled to produce another article by the same ALM process.

Selective sintering may be used to produce shaped articles from powders of some metals, ceramics, glasses and thermoplastic polymers.

Presently, the most commonly used thermoplastic polymer material for selective sintering ALM processes is Nylon because it has a re-solidification temperature significantly lower than its melting temperature. This means that the powder bed process can be conducted without requiring any support structures for the article being produced, making Nylon particularly suitable for rapid prototyping applications. However, for many engineering application Nylon is unsuitable. It has a relatively low strength, has a relatively low resistance to chemical attack, and is relatively susceptible to UV degradation compared with high-performance engineering thermoplastics. Furthermore, the relatively low glass temperature of Nylon means that it has a continuous service temperature (the highest temperature at which a material can function for an extended period of time without failing) of approximately 60-90 degrees Celsius. This makes Nylon unsuitable for many engineering applications.

Engineering plastics exhibit superior mechanical and thermal properties in a wide range of conditions. Some examples of high performance engineering thermoplastics currently used in the aerospace industry, which has particularly demanding material requirements, include polyetheretherketones (PEEK), polyetherketones (PEK), and polyetherimides (PEI). To a more limited extent acrylonitrile butadiene styrene (ABS) plastics are used. Whilst ABS plastics provide high strength, chemical resistance and good stiffness their use can be limited by relatively low operating temperatures compared with other high performance thermoplastics, such as those mentioned above.

There is a desire to produce high performance thermoplastic components using the selective sintering ALM process outlined above. However, there is currently a problem in that many high performance thermoplastics not only have a high melting temperature, and therefore require processing at higher temperatures, but they also generally have a re-solidification temperature only just below the melting temperature.

In the case of PEEK, a material which is particularly suitable for aerospace and medical device applications, the re-solidification temperature can be less than 1 degree Celsius below the melting temperature, which is approximately 375 degrees Celsius. It has recently been suggested to produce PEEK components by selective sintering ALM. However, the suggested approach is to maintain the powder bed in the sintering chamber at a temperature very close to the PEEK melt temperature, following process principles that apply for the much lower temperature Nylon material.

Producing an article by the ALM selective sintering process can take a long time. A typical build speed currently may be of the order of 0.1 kg/hr. Therefore, even relatively small articles can take several hours to produce. PEEK is susceptible to thermal aging due to shortening of the polymer chain lengths, and so maintaining PEEK material at high temperatures for extended periods of time has adverse consequences on its material properties. In particular, the fracture toughness of PEEK is significantly reduced by thermal aging.

To date it has not been possible to produce an article from PEEK by the ALM selective sintering process without significant degradation in the PEEK material properties. Moreover, the un-sintered powder material, which would normally be recycled for use in producing a subsequent article, will probably need to be discarded as the thermal aging effects of a further process would reduce the fracture toughness of the material yet further. The high material wastage adds significantly to the unit cost of each article produced.

SUMMARY OF THE INVENTION

A first aspect of the invention provides an additive layer manufacturing (ALM) method for producing a shaped article, comprising providing a powdered thermoplastic polymer material having a re-solidification temperature at most 10% below its melting temperature on the Celsius scale, depositing successive layers of the powdered polymer material and selectively sintering each layer prior to deposition of the subsequent layer so as to form the article, wherein during its production the article is maintained at a temperature above the glass transition temperature and significantly below the re-solidification temperature of the polymer.

The invention is advantageous in that the production process can be conducted at a temperature where thermal aging of the polymer material and consequent degradation of the material properties is mitigated or at least substantially reduced. Within the processing temperature window, the lower the processing temperature the lower the thermal degradation of the material but the higher the power of the energy source for sintering, and vice versa. At temperatures close to the glass transition temperature, the article would require significantly more support structures to prevent distortion caused by the accumulation of thermal residual stresses generated during the solidification process. Conversely, processing at the upper end of the temperature range, with lower beam energy, may require little, or no, support structures in the build. The higher powered energy source consumes more energy and the support structures increase the complexity of the build process, which both contribute to increased processing costs at lower process temperatures. The processing temperature selected will therefore be a compromise between processing costs and material properties of the finished article.

The polymer is preferably a semi-crystalline polymer.

The polymer may be selected from the group comprising polyaryletherketones, polyetheretherketones (PEEK), polyetherketones (PEK), polyetherimides (PEI), or acrylonitrile butadiene styrenes (ABS).

The polymer preferably has a re-solidification temperature at most 5% below its melting temperature on the Celsius scale.

The shaped article may be constructed on a horizontal, planar substrate. Since the article is maintained at a temperature below the re-solidification temperature during production, unacceptable distortion of the shape of the article may occur unless the build substrate is horizontal and planar to a high degree of accuracy. A flat build surface alone may not be enough to prevent shape distortion at lower processing temperatures and so the support structures mentioned above may be built concurrently with the article to provide the desired support.

The substrate is preferably moveable in the vertical direction. The substrate can therefore be lowered as each successive layer of the powder is applied during the build.

The shaped article is preferably constructed within a sintering chamber.

The sintering chamber may be maintained at a temperature above the glass transition temperature and significantly below the re-solidification temperature of the polymer.

The sintering chamber may be maintained at a temperature below the continuous service temperature of the polymer material.

The sintering chamber may be maintained at a temperature below the temperature at which the strength of the polymer material after 2,000 hours at that temperature is decreased by at least 10% due to thermal aging.

The un-sintered polymer material is preferably re-used for producing another article according to the method of this invention.

The powder is preferably selectively sintered using a laser source, such as a carbon dioxide laser, or an electron beam source.

The method may further comprise producing a support structure and then producing the article integrally with and upon the support structure, wherein the support structure and the article are produced using the same ALM method. The support structure may include an array of slender struts. Alternatively, the support structure may comprise a block. The support structure is removed from the article once the build process is complete and the article has been allowed to cool.

A further aspect of the invention provides an article produced according to the method of the invention. The article may be a component, a sample, a model, a prototype, or any other article that may be derived during a product life cycle from pre-production to full scale production.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
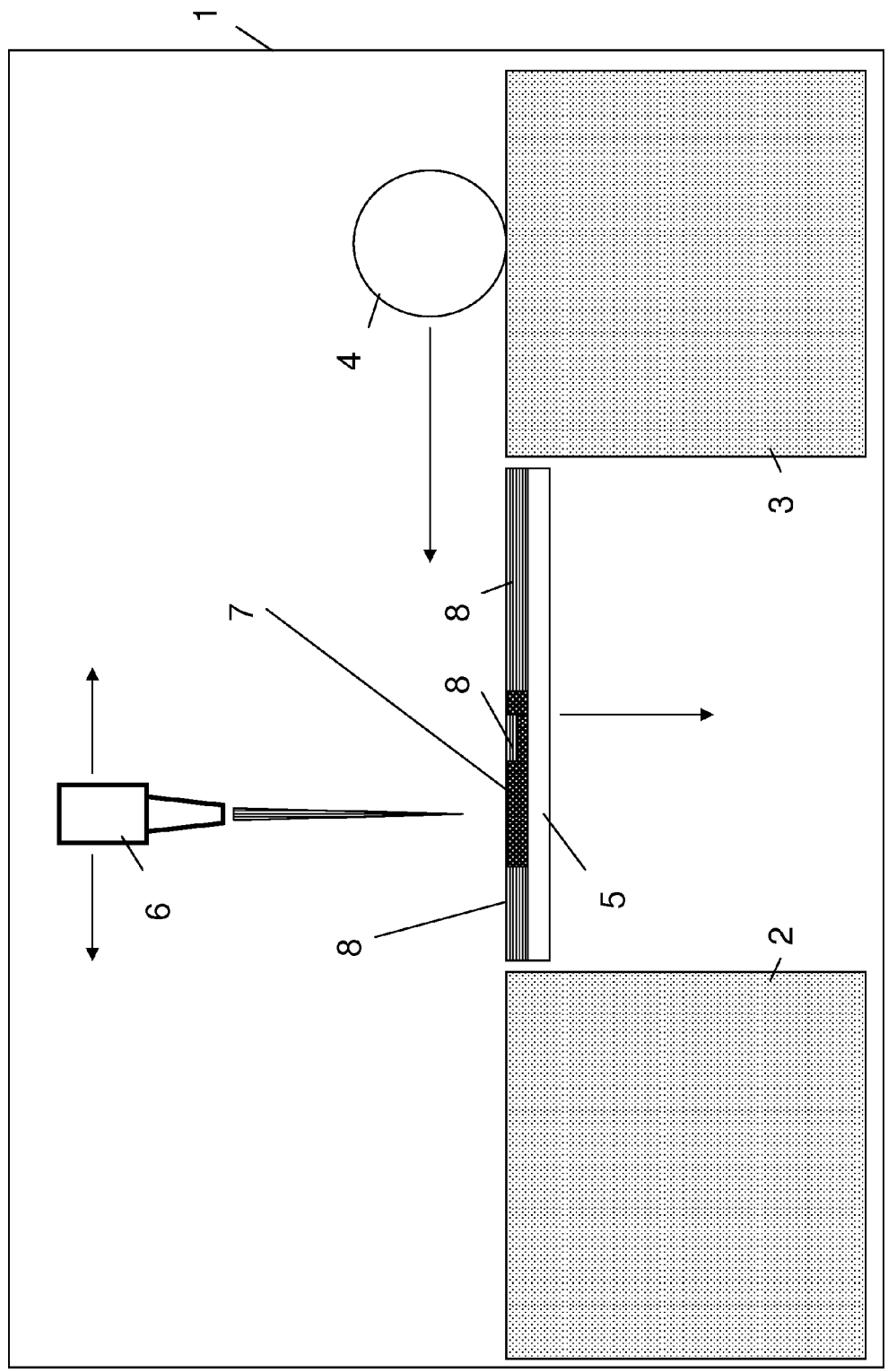
FIG. 1 illustrates schematically a system for producing an article according to the ALM selective sintering process.

FIG. 1 illustrates schematically a power bed selective sintering ALM system for producing a shaped article.

The system comprises a sintering chamber 1 housing a pair of feed containers 2, 3 containing powdered polymer material. A roller 4 picks up powder from one of the feed containers (in the example of FIG. 1, the roller 4 is picking up powder from the right hand feed container 3) and rolls a continuous bed of powder over a support member 5.

A laser head 6 then scans over the powder bed, and a laser beam from the head is turned on and off to direct the laser to selected parts of the powder bed so as to melt the powder in a desired pattern. Movement of the laser head 6 and modulation of the laser beam is determined by a Computer Aided Design (CAD) model of the desired profile and layout of the part.

The support member 6 then moves down by a small distance (typically of the order of 0.1 mm) to prepare for growth of the next layer. After a pause for the melted powder to solidify, the roller 4 proceeds to roll another layer of powder over support member 6 in preparation for sintering.

Thus as the process proceeds, a sintered part 7 is constructed, supported by unconsolidated powder parts 8. After the article has been completed, it is removed from support member 5 and the unconsolidated powder 8 is sieved before being returned to the feed containers 2, 3.

The temperature within the sintering chamber 1 is maintained at a desired temperature selected according to the powder polymer material.

Figure 2:
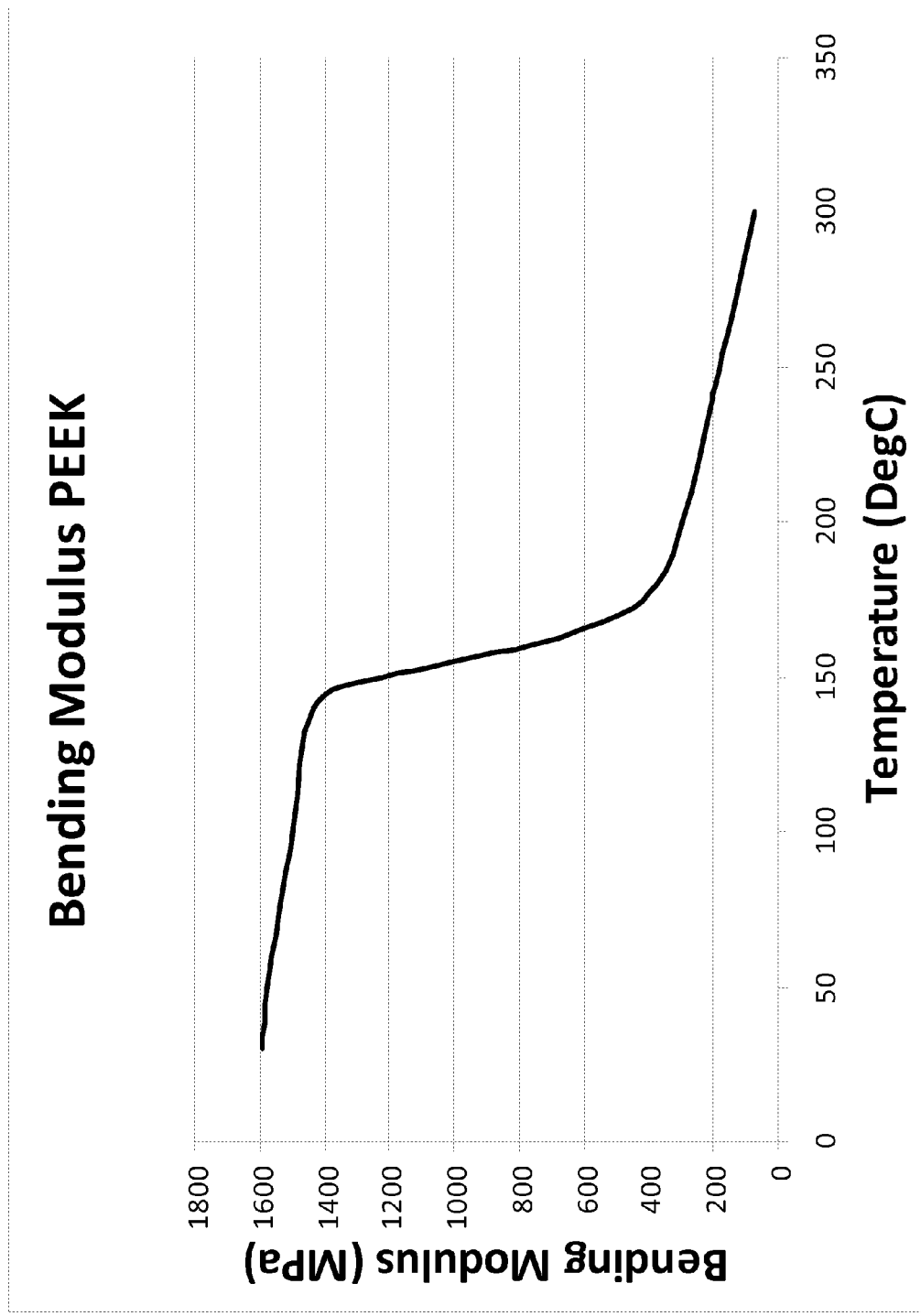
FIG. 2 illustrates the variance of bending modulus with temperature for PEEK material.

FIG. 2 illustrates the variance of bending modulus with temperature for PEEK material. PEEK is a semi-crystalline high performance thermoplastic suitable for high temperature engineering applications. PEEK has a melting temperature, $T_m$, of approximately 375 degrees Celsius and retains useful material properties up to a temperature of around 315 degrees Celsius. PEEK has a glass temperature, $T_g$, of approximately 160 degrees Celsius, which is clearly visible in FIG. 2. PEEK has an onset re-crystallisation temperature, $T_R$, from the melt less than approximately 1 degree Celsius below $T_m$.

Figure 3:
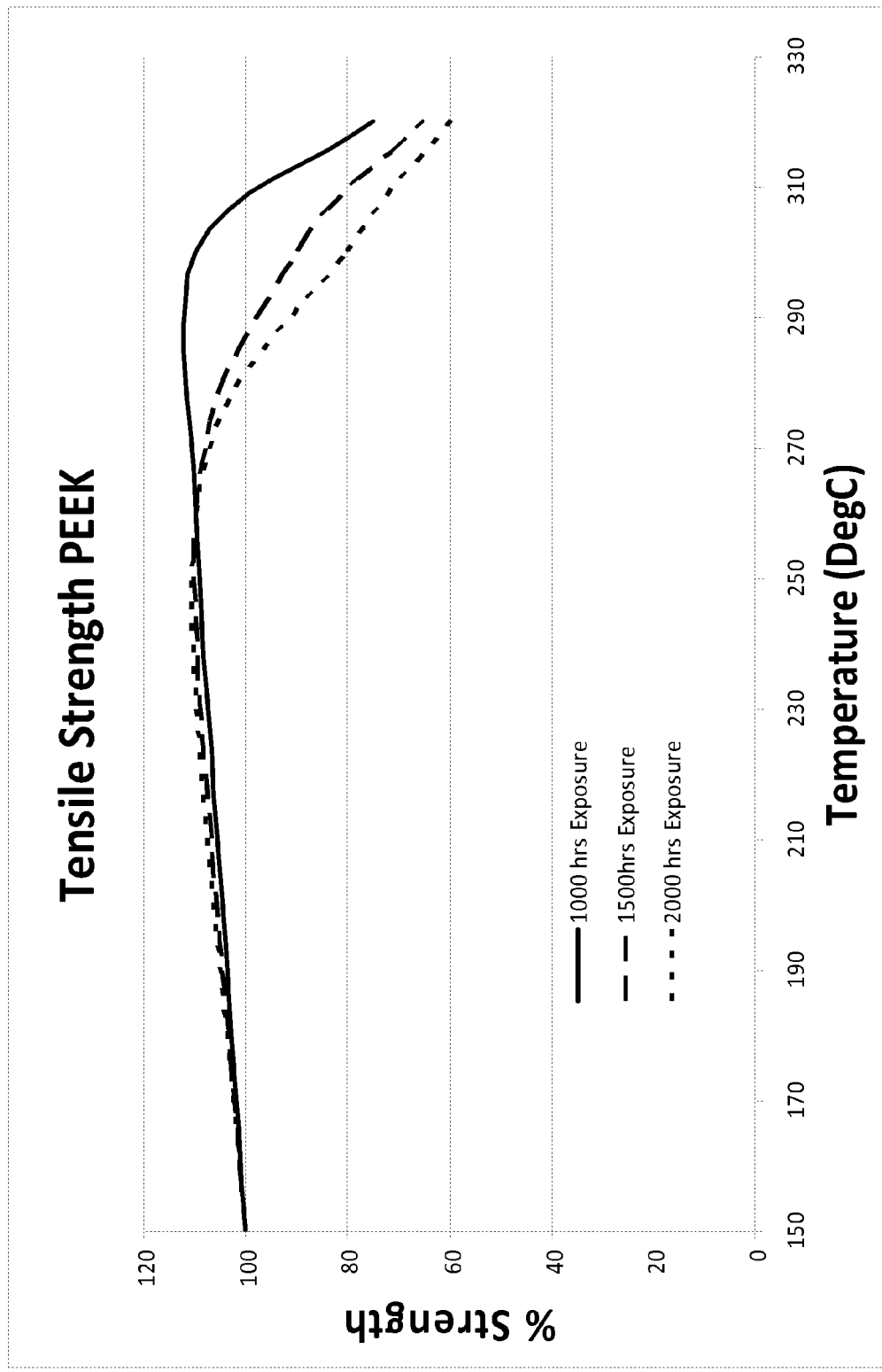
FIG. 3 illustrates the variance of tensile strength (as a percentage of room temperature strength) with temperature and exposure for PEEK material.

PEEK has a continuous service temperature (the highest temperature at which a material can function for an extended period of time without failing) of approximately 260 degrees Celsius. FIG. 3 illustrates the variance of tensile strength (as a percentage of room temperature strength) with temperature for PEEK material at exposure periods of 1000 hours, 1500 hours and 2000 hrs. PEEK is susceptible to thermal aging because high temperatures above approximately 260 degrees Celsius cause a shortening of the polymer chain lengths, which degrades the material properties. For example, PEEK becomes brittle when exposed to temperatures in excess of approximately 260 degrees Celsius for extended periods of time. From FIG. 3 it can be seen that little or no degradation of the material properties of PEEK occurs below 260 degrees Celsius even when exposed to this temperature for 2000 hours.

Producing a shaped article by the powder bed selective sintering ALM process described above can take a long time. For example, a typical ALM system may operate at a build rate of around 0.1 kg/hr and so a 5 kg article may take around 50 hours to build. The amount of un-sintered powder material at the completion of each build may typically be around 50%-80% of the total material used in the build. This un-sintered powder is preferably recycled for use in a subsequent build. It can be seen that if the ALM system is run continuously to produce 50 articles and the un-sintered powder in returned to the feed containers 2, 3 then some of the powder may be exposed to the high temperature within the sintering chamber 1 for a period of up to 2500 hours.

When processing Nylon, the most commonly used thermoplastic material in selective sintering ALM processing, the sintering chamber is typically maintained at a temperature just below the re-solidification temperature of the Nylon material. By maintaining the temperature within the sintering chamber as high as possible, the energy input required from the laser source to melt the powder is minimised. The cost benefits of using a lower powered laser outweigh the energy cost of raising the temperature of the sintering chamber and so the sintering chamber is maintained at as high a temperature as possible, bearing in mind that this must be below the re-solidification temperature of the polymer material.

It has been observed that the previous rationale behind selecting the temperature for the sintering chamber should no longer be applied when processing PEEK and other high performance thermoplastics. The effects of thermal aging when processing PEEK for extended periods of time at very high temperatures have been found to not only significantly degrade the material properties of PEEK to an unacceptable level but also lead to a wastage rate of the un-sintered material of around 100%.

By reducing the process temperature within the sintering chamber to significantly below the re-solidification temperature of the polymer material markedly improves both the material properties and the proportion of un-sintered material that can be recycled. Whilst a higher power laser source is required to melt the polymer powder, the overall unit cost of the articles produced is significantly reduced, contrary to expectation. Furthermore, the material properties of the high performance thermoplastic can be better maintained leading to a much improved end product.

Figure 4:
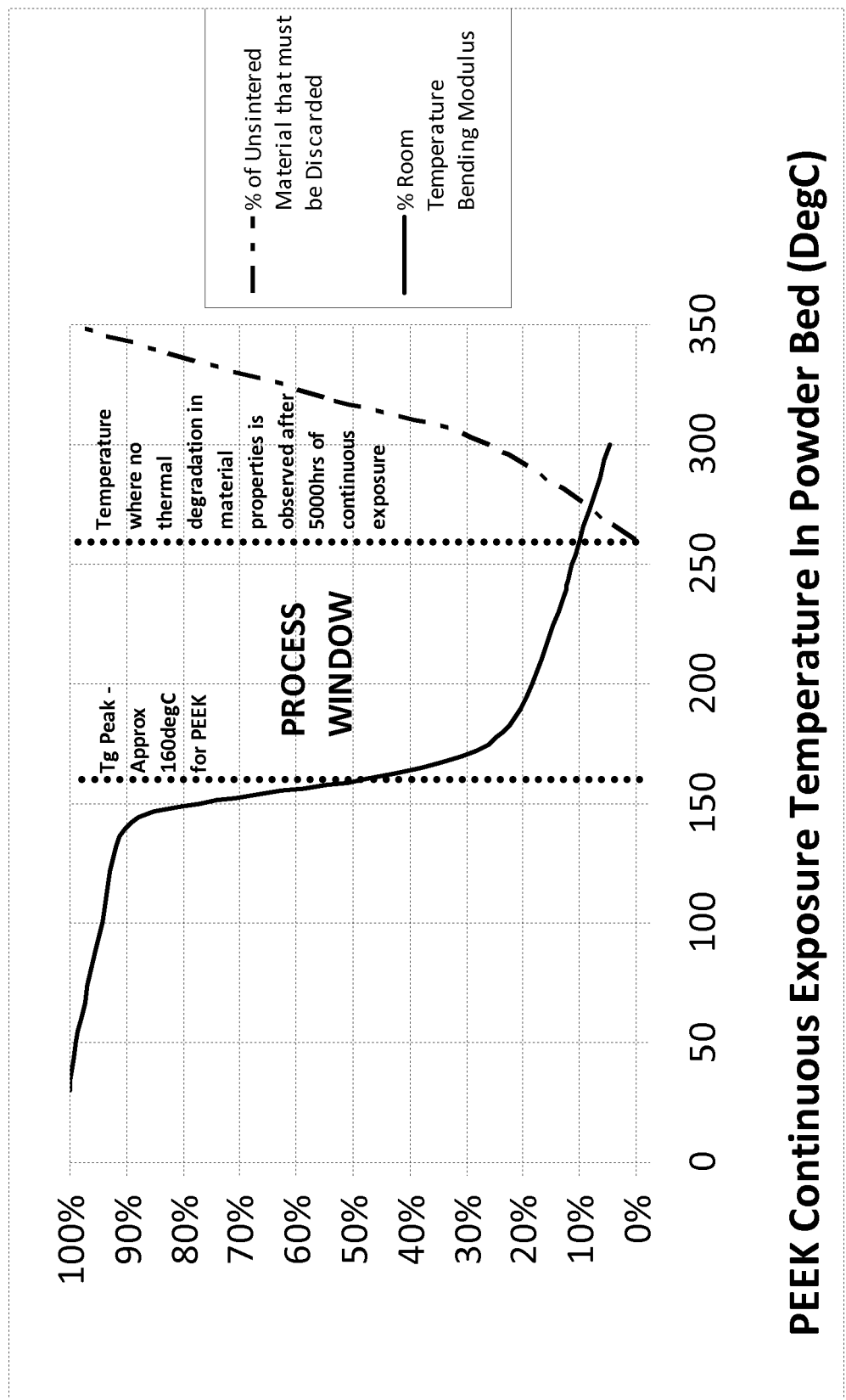
FIG. 4 illustrates graphically the determination of a process temperature window for PEEK material in a powder bed selective sintering ALM processing system based upon bending modulus and thermal aging properties of PEEK.

Analysis of thermal aging of PEEK material has shown that the proportion of un-sintered material that would need to be discarded (i.e. not recycled) during a multiple build production run would be 0% if the temperature within the sintering chamber is maintained below around 260 degrees Celsius. This is based upon the thermal aging of PEEK at an exposure time of 5000 hours, which has been shown to have no effect on the material properties of PEEK below around 260 degrees Celsius. As shown in FIG. 4, the proportion of un-sintered PEEK material that must be discarded rises sharply with increasing temperature process above 260 degrees Celsius as thermal degradation of the material takes place.

At the other end of the process temperature scale, it has been observed that the polymer material must be kept above its glass temperature for the selective laser sintering process.

Referring again to FIG. 4 it can be seen that an appropriate process window for PEEK using the selective sintering ALM process extends between a lower bound that is above the glass temperature of PEEK at around 160 degrees Celsius and an upper bound that is significantly below the re-solidification temperature of PEEK and preferably is no higher than the continuous service temperature (5000 hours) of PEEK at around 260 degrees Celsius.

Within the process temperature window, the lower the processing temperature the lower the thermal degradation of the material but the higher the power of the energy source for sintering, and vice versa. At temperatures close to the glass transition temperature, the article would require significantly more support structures to prevent distortion caused by the accumulation of thermal residual stresses generated during the solidification process. Conversely, processing at the upper end of the temperature range, with lower beam energy, may require little, or no, support structures in the build. The higher powered energy source consumes more energy and the support structures increase the complexity of the build process, which both contribute to increased processing costs at lower process temperatures. The processing temperature selected will therefore be a compromise between processing costs and material properties of the finished article.

Each high performance thermoplastic that may desirably be processed using the selective sintering ALM method will have its own process temperature window, dependent upon the glass temperature and the thermal aging properties of the material. Other candidate high performance thermoplastics include other semi-crystalline polymers such as PEK and PEI, and ABS.

A key feature of these high performance thermoplastics is that they have a re-solidification temperature close to their melting temperature. Typically, the re-solidification temperature will be at most 10% below the melting temperature, and preferably will be at most 5% below the melting temperature for the high performance thermoplastic. This contrasts with Nylon which has a melting temperature of around 180-250 degrees Celsius and a re-solidification temperature of around 140-200 degrees Celsius.

Although the invention has been described above with reference to one or more preferred embodiments, it will be appreciated that various changes or modifications may be made without departing from the scope of the invention as defined in the appended claims.

The invention claimed is:

1. An additive layer manufacturing (ALM) method for producing a shaped article, comprising providing a powdered thermoplastic polymer material selected from the group comprising polyaryletherketones, polyetheretherketones (PEEK), or polyetherketones (PEK) having a re-solidification temperature at most 10% below its melting temperature on the Celsius scale, depositing successive layers of the powdered polymer material and selectively sintering each layer prior to deposition of the subsequent layer so as to form a support structure and then form the article upon the support structure, the support structure and the article are produced using the same ALM method, wherein during its production the article is maintained at a temperature above the glass transition temperature and below the re-solidification temperature of the polymer, and the shaped article is constructed within a sintering chamber maintained at a temperature below the continuous service temperature of the polymer material.

2. A method according to claim 1, wherein the polymer is a semi-crystalline polymer.

3. A method according to claim 1, wherein the polymer has a re-solidification temperature at most 5% below its melting temperature on the Celsius scale.

4. A method according to claim 1, wherein the shaped article is constructed on a horizontal, planar substrate.

5. A method according to claim 4, wherein the substrate is moveable in the vertical direction.

6. A method according to claim 1, wherein the sintering chamber is maintained at a temperature above the glass transition temperature and significantly below the re-solidification temperature of the polymer.

7. A method according to claim 1, wherein the sintering chamber is maintained at a temperature below the temperature at which the strength of the polymer material after 2,000 hours at that temperature is decreased by at least 10% due to thermal aging.

8. A method according to claim 1, wherein the un-sintered polymer material is re-used for producing another article according to the method of claim 1.

9. A method according to claim 1, wherein the polymer is selectively sintered using a laser source.

10. A method according to claim 1, wherein the support structure includes an array of slender struts.

11. An additive layer manufacturing (ALM) method for producing a shaped article, comprising providing a powdered thermoplastic polymer material having a re-solidification temperature not significantly below its melting temperature on the Celsius scale, depositing successive layers of the powdered polymer material and selectively sintering each layer prior to deposition of the subsequent layer so as to produce a support structure and then form the article upon the support structure, the support structure and the article are produced using the same ALM method, wherein during its production the article is maintained at a temperature above the glass transition temperature and below the re-solidification temperature of the polymer, and the shaped article is constructed within a sintering chamber maintained at a temperature below the continuous service temperature of the polymer material.

12. An additive layer manufacturing (ALM) method for producing a shaped article, comprising providing a powdered thermoplastic polymer material, depositing successive layers of the powdered polymer material and selectively sintering each layer prior to deposition of the subsequent layer so as to produce a support structure and then form the article upon the support structure, the support structure and the article are produced using the same ALM method, wherein during its production the article is maintained at a temperature above the glass transition temperature and below the re-solidification temperature of the polymer, and wherein the polymer is selected from the group comprising polyaryletherketones, polyetheretherketones (PEEK), or polyetherketones (PEK), and the shaped article is constructed within a sintering chamber maintained at a temperature below the continuous service temperature of the polymer material.

13. An additive layer manufacturing (ALM) method for producing a shaped article, comprising providing a powdered thermoplastic polymer material, depositing successive layers of the powdered polymer material and selectively sintering each layer prior to deposition of the subsequent layer so as to produce a support structure and then form the article upon the support structure, the support structure and the article are produced using the same ALM method, wherein during its production the article is maintained at a temperature above the glass transition temperature and significantly below the re-solidification temperature of the polymer, and wherein the polymer has a continuous service temperature in excess of 100 degrees Celsius, and the shaped article is constructed within a sintering chamber maintained at a temperature below the continuous service temperature of the polymer material.

* * * * *